April 24, 1956 — M. J. G. TIPPER — 2,742,944
FASTENING OF PLEATED CASINGS
Filed June 19, 1952
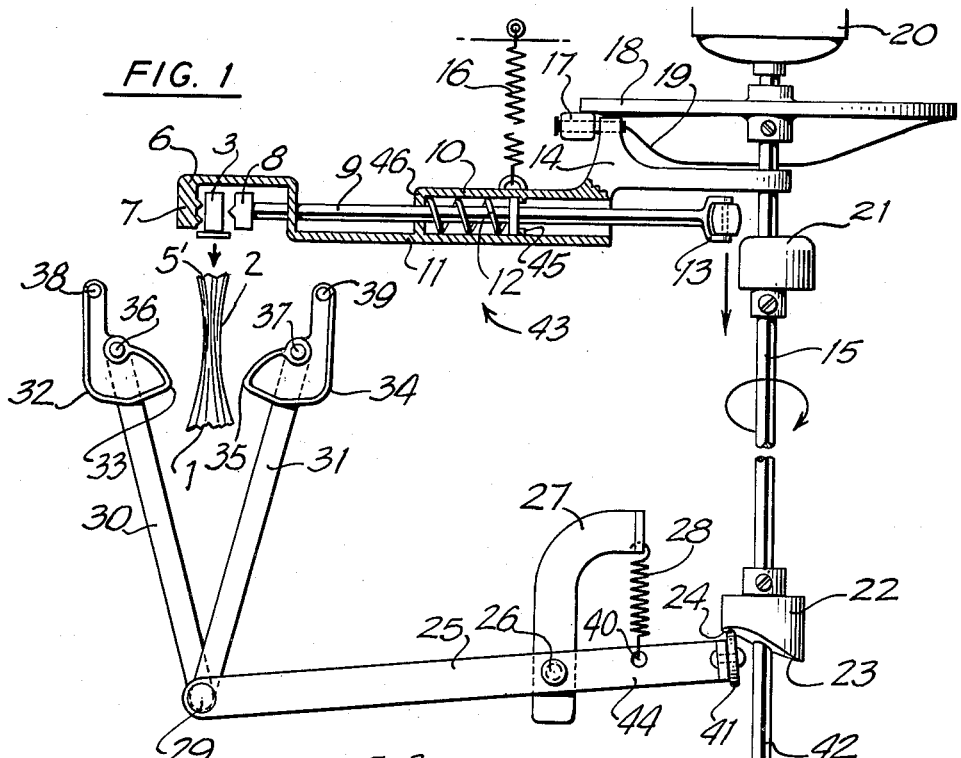
INVENTOR
MAYNARD J.G. TIPPER
BY
ATTORNEY United States Patent Office 2,742,944
Patented Apr. 24, 1956

2,742,944

FASTENING OF PLEATED CASINGS

Maynard J. G. Tipper, Sacramento, Calif., assignor of one-half to Albert O. Steckman, Newark, N. J.

Application June 19, 1952, Serial No. 294,467

2 Claims. (Cl. 153—1)

This invention deals with the fastening of pleated articles, particularly sausage casing ends and, more specifically, with the method and means of guiding said pleated ends into fasteners therefor.

Pleating machines now are on the market. In the case of machines for fastening casing ends, such units are operated by persons who place the sausage casing end into the pleater which forms the pleat. Thereafter, the operator of the unit grasps the pleated end while it is still in the machine and withdraws it while holding the pleats so that they do not open. The next step is to gather by hand the pleated end which was in the machine and insert it, by hand, into the fastener. Finally, the fastener is inserted into the crimper and crimped to the pleated casing.

With the device of the present invention, it is possible to perform all of these operations automatically, so that all that the operator need do is to insert the casing end into the machine and, after a few motions of the machine, remove the pleated, fastened and crimped casing. The enormous advantages of such an operation are apparent from the point of view of simplicity of operation, elimination of skill on the part of the operator, increase in production speed, etc.

The accompanying drawing shows the essential features of the invention. The pleating section of the machine may be of conventional type and need not be shown here. Figure 1 shows a top or plan view, partly in cross section and partly cut away, of the pleated end guiding means and crimping mechanism, together with the drive therefor, the position of the units being the idle position prior to the fastening operation. Figure 2 depicts a similar view in which the units are in the working or fastening and pre-crimping position. An isometric view of a sausage casing end fastened and crimped according to the invention is illustrated in Figure 3. Similar numerals refer to similar parts in the various figures.

Referring again to the drawing, numeral 1 represents a sausage casing end carrying pleats 2 and having tip 5 over which slides fastener 3, said fastener preferably having an oblong shaped body 3' and a small flange 4 disposed adjacent to the sausage portion of the casing. The casing end 1 is pleated to make pleats 2 by any conventional pleating unit (not shown), and the pleated end remains disposed between guides 32 and 34 as shown in Figure 1. It will be observed that pleated casing tip 1 at this point has a flare 5' which would prevent its entry into a narrow fastener.

It might be mentioned here that motor 20, through shaft 15, provides the power for actuating and operating all of the units of the machine, including the pleater, these operations being properly timed by means of cams such as 19, 21, 22, etc. on shaft 15. The end 42 of shaft 15 is mounted in an end bearing at the opposite end of the machine (away from motor 20).

After casing end 1 is pleated (at which time cam follower 41 is contacting cam 22 at its innermost point 24), shaft 15 is meanwhile turning and, as follower 41 reaches outermost point 23 on cam 22, the latter forces out arm 44 which is mounted on fixed pivot 26. This causes arm 25 to be forced inwardly bringing together guides 32 and 34 from their positions in Figure 1 to their positions in Figure 2. This action causes guide surfaces 33 and 35 to "wipe" the casing end and close flare 5' to a size less than that of the opening in fastener 3, and to position properly the pleated tip to receive the fastener.

As this takes place while shaft 15 is turning, cam 19 on wheel 18 forces outwardly follower 17 attached to the fastening and crimping unit 43, causing the whole unit 43 to move outwardly. Since fastener 3 is in line with pleated casing 1 positioned between holding surfaces 33 and 35 of guides 32 and 34 (Fig. 2), it is possible to slip fastener 3 over the held tip 5 of the casing. This takes place as fastening unit 43 moves outwardly in the direction of the arrow (casing end 1 being stationary all of the time). When flange 4 of fastener 3 reaches guides 32 and 34, it forces the guides outwardly while at the same time fastener 3 is glided over pleated casing tip 5, and finally, as guides 32 and 34 swing away to the idle position (aided by spring 28, attached to stationary arm 27), fastener 3 is disposed over the entire end of casing tip 5, as in Figure 3.

Thereafter, while fastening unit 43 is in this working position and shaft 15 is still turning, cam 21 attached to shaft 15 forces crimping tool 9 laterally (via follower 13), thus crimping body 3' of fastener 3 by pressing tool end 8 against the fastener side which is backed by stationary crimping tool 7 attached to head 6. Upon further rotation of shaft 15, cam 19 allows fastening unit 43 to swing back to idle position as in Figure 1. This is facilitated by spring 16, one end of which is attached to unit 43, the other end being attached to a stationary point on the frame (not shown). It will be observed that unit 43 is attached to arm 14 which rides on shaft 15, the latter carrying cam 18 which impresses an intermittent thrust on cam follower 17. Cylinder 10 surrounding crimping tool 9, contains coil spring 12 which impresses a thrust upon a shoulder on tool 9, which shoulder is held in place by stop 45 inside cylinder wall 46, causing follower 13 to ride tightly against cam 21 when contacted therewith.

As unit 43 returns to idle position, fastener 3 slides out of head 6 (since it is now crimped onto stationary casing tip 5), thus allowing another fastener to fall into the same place in head 6 from a hopper or other source (not shown), making the unit ready for the next fastening operation, after the fastened casing 1 is removed from the machine in the aforesaid manner.

As to the guide means depicted in Figures 1 and 2, guides 32 and 34 are oppositely disposed and in mirror image relation to each other, on each side of pleated casing end 1. When arm 25 is moved inwardly through action of cam 22, arms 30 and 31, which are pivoted to the end of arm 25 at 29, also move inwardly. The innermost ends of arms 30 and 31 are pivoted at movable pivots 36 and 37, respectively, on guides 32 and 34, respectively. Guides 32 and 34 are pivoted on fixed pivots 38 and 39, respectively, so that, as arms 30 and 31 move inwardly, guides 32 and 34 swing inwardly due to the leverage at floating pivots 36 and 37.

During all of these operations, casing 1 remains stationary after it has been pleated. As guides 32 and 34 move inwardly, surfaces 33 and 35 of the guides "wipe" both sides of the pleated end of the casing, thus gathering in flare 5', so that casing tip 5 now is narrow enough to fit into the opening of fastener 3. The guides also serve the important function of positioning the casing properly so that fastener 3 may be slipped on readily. It has been found unnecessary to impose any pressure against the pleated casing by guides 32 and 34 other than that required to keep the pleats together to avoid flaring.

I claim:

1. A machine for facilitating the fastening of a hollow fastener over the pleated end of a casing, comprising a pair of oppositely-disposed flat levered guide members, one on each side of said pleated end, disposed in mirror-image relation to each other, a fixed pivot disposed near the innermost part of each guide member, a flat guide surface on the casing side of each guide member, constructed and arranged to hold the tip of said pleated end in compressed condition suitable for slipping thereover of said fastener, an arm swivably attached to each guide member and disposed outwardly of said casing end, a swivel disposed on each guide member between said fixed pivot and said flat guide surface, to which said arm is attached and enabling said arm, when it is moved inwardly, to swing said guide member against said pleated end with a wiping action, means for moving said arms inwardly to effect the guiding operation, a movable head constructed and arranged to hold said fastener in position to circumscribe said compressed casing end, moving means for moving said head towards said pleated end and sliding said fastener over said wiped compressed casing end, after which operation the fastener is fastened onto said casing, said arms being constructed and arranged to retract said fastener over said wiped compressed casing end, after which operation the fastener is fastened onto said casing, said arms being constructed and arranged to retract said guide members at the moment said fastener reaches said pleated end prior to being moved over the casing, and retracting means for retracting said head after fastening of the fastener onto said casing for repeating the cycle with another fastener and casing.

2. A machine according to claim 1 in which a crimping tool is mounted in said movable head adjacent one side of said fastener, and pressure means for impressing a thrust on said crimping means immediately during the moment said fastener has been slipped over said wiped compressed casing end, whereupon the fastener is fastened to said casing end.

References Cited in the file of this patent

UNITED STATES PATENTS

| | | |
|---|---|---|
| 1,493,075 | Hirschhorn | May 6, 1924 |
| 1,688,499 | Jones | Oct. 23, 1928 |
| 1,851,676 | Litchfield | Mar. 29, 1932 |
| 2,608,333 | Marziani | Aug. 26, 1952 |